(12) United States Patent
Sagi et al.

(10) Patent No.: US 11,526,691 B2
(45) Date of Patent: Dec. 13, 2022

(54) LEARNING DEVICE, LEARNING METHOD, AND STORAGE MEDIUM

(71) Applicant: NEC Corporation, Tokyo (JP)

(72) Inventors: Kazutoshi Sagi, Tokyo (JP); Takahiro Toizumi, Tokyo (JP); Yuzo Senda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 260 days.

(21) Appl. No.: 16/772,057

(22) PCT Filed: Dec. 14, 2017

(86) PCT No.: PCT/JP2017/044898
§ 371 (c)(1),
(2) Date: Jun. 11, 2020

(87) PCT Pub. No.: WO2019/116496
PCT Pub. Date: Jun. 20, 2019

(65) Prior Publication Data
US 2021/0073586 A1    Mar. 11, 2021

(51) Int. Cl.
*G06K 9/62* (2022.01)
*G01S 13/90* (2006.01)

(52) U.S. Cl.
CPC ........ *G06K 9/6257* (2013.01); *G01S 13/9027* (2019.05); *G06K 9/6269* (2013.01)

(58) Field of Classification Search
CPC . G06K 9/6257; G06K 9/6269; G01S 13/9027
See application file for complete search history.

(56) References Cited

U.S. PATENT DOCUMENTS

2013/0094733 A1    4/2013 Nosato et al.
2020/0167914 A1*   5/2020 Stamatoyannopoulos ..................
                                                    G06T 7/0012

FOREIGN PATENT DOCUMENTS

JP    06-162173 A    6/1994
JP    2004-62719 A   2/2004

OTHER PUBLICATIONS

Agnan Kessy et al., "Optimal Whitening and Decorrelation", Cornell University Library, Dec. 2, 2015, pp. 1-14 (14 pages total).
(Continued)

*Primary Examiner* — Michael R Neff
(74) *Attorney, Agent, or Firm* — Sughrue Mion, PLLC

(57) ABSTRACT

Provided is a learning device that can generate a feature deriving device capable of deriving, for an identical object, feature amounts which respectively express a feature of the object in different forms and which are mutually related. This learning device comprises: an acquisition unit that acquires first data and second data, with different forms of the object recorded therein; an encoder that derives a first feature amount from the first data; a conversion unit that converts the first feature amount to a second feature amount; a decoder that generates third data from the second feature amount; and a parameter updating unit that updates, on the basis of a comparison between the second data and the third data, the value of a parameter used in the derivation of the first feature amount, and the value of a parameter used in the generation of the third data.

15 Claims, 9 Drawing Sheets

(56) References Cited

OTHER PUBLICATIONS

Communication dated Nov. 17, 2020, from the European Patent Office in application No. 17934747.1.
Yuta Ashihara, et al., "Middle layers shareing for transfer learning to predict rotating image in DeepLearning", IPSJ SIG Technical Report, Intelligent Computing Systems (ICS), Feb. 24, 2016, pp. 1-8, vol. 2016-ICS-182, No. 1, Internet: <URL:https://ipsj.ixsq.nii.ac.jp/ej/?action=repository_uri&item_id=157634&file_id=1&file_no=1>.
International Search Report for PCT/JP2017/044898 dated Feb. 13, 2018 (PCT/ISA/210).
Written Opinion for PCT/JP2017/044898 dated Feb. 13, 2018 (PCT/ISA/237).

* cited by examiner

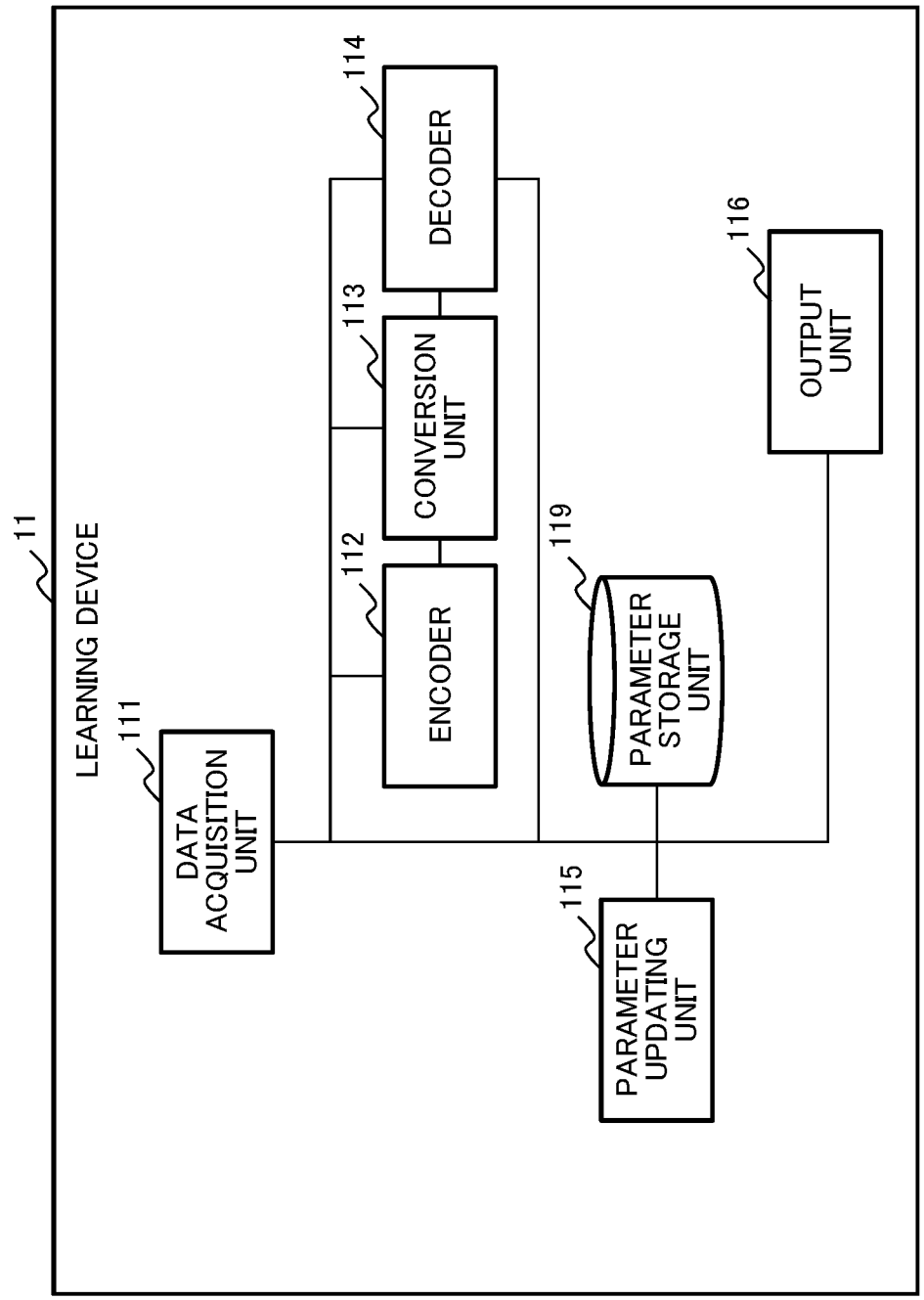

Fig. 3

$$S_k = \begin{pmatrix} 0 & \cdots & 0 & 1 & & & 0 \\ \vdots & \ddots & \vdots & & \ddots & & \\ 0 & \cdots & 0 & 0 & & & 1 \\ 1 & & 0 & 0 & \cdots & & 0 \\ & \ddots & & \vdots & & \ddots & \vdots \\ 0 & & 1 & 0 & \cdots & & 0 \end{pmatrix} \begin{matrix} \} \text{n-kr ROWS} \\ \\ \} \text{kr ROWS} \end{matrix}$$

kr COLUMNS, n-kr COLUMNS

LEARNING DEVICE, LEARNING METHOD, AND STORAGE MEDIUM

CROSS REFERENCE TO RELATED APPLICATIONS

This application is a National Stage of International Application No. PCT/JP2017/044898 filed Dec. 14, 2017, the disclosure of which is incorporated herein in its entirety by reference.

TECHNICAL FIELD

The present disclosure relates to a technology of learning performed by a computer.

BACKGROUND ART

In construction of a classifier performing classification of a target indicated in data, use of a variable well representing a feature of the target leads to improvement of precision of classification. As a method of deriving a variable well representing a feature of a target from input data, a method of using an autoencoder is well known.

A typical autoencoder includes an input layer, an intermediate layer, and an output layer. The typical autoencoder determines optimum values of a weight and a bias used for encoding (that is, conversion from data in the input layer to data in the intermediate layer), and a weight and a bias used for decoding (that is, conversion from data in the intermediate layer to data in the output layer), based on a comparison between data input to the input layer and data output from the output layer.

Data output in the intermediate layer by encoding using the weight and the bias determined as a result of learning by the autoencoder can be considered information well representing a feature of a target. The data output in the intermediate layer are generally referred to as a "feature value vector," a "feature vector," or simply a "feature value" or a "feature." The data output in the intermediate layer are herein also referred to as a "set of latent variable values" or a "latent variable vector."

PTL 1 is a literature describing a technology related to the present invention. PTL 1 discloses an image processing device converting (in another word, normalizing) a size, a rotation angle, a position, and/or the like of a target in an image to a state suitable for identification. Magnitude of the conversion for normalization is determined by a coefficient determined based on a relation between a vector (mapping vector) in a case of mapping data of a coarse-grained image onto a space F by nonlinear transformation and a subspace including a basis vector representing a feature of a learning sample. PTL 1 describes that when an autoencoder is used in the technology, an output of the output layer of the autoencoder corresponds to a mapping by the aforementioned nonlinear transformation, and an output of the intermediate layer corresponds to a projection of the mapping vector on the subspace.

CITATION LIST

Patent Literature

PTL 1: Japanese Unexamined Patent Application Publication No. 2004-62719

SUMMARY OF INVENTION

Technical Problem

A feature value vector derived by a neural network optimized by a common autoencoder is not necessarily represented in such a way that different forms taken by the same target interrelate with each other. Then, for example, it is assumed that, by use of a feature value vector derived by a neural network optimized by a common autoencoder, a classifier for classifying a chair appearing in an image as a chair is generated by learning using only images of the chair photographed in a direction indicated by FIG. 1A as training data. In such a case, the generated classifier may not be able to identify a chair photographed in a direction indicated by FIG. 1B or from an angle indicated by FIG. 1C as a chair. The reason is that feature value vectors unrelated to each other may be derived from data recorded in forms (a direction and an angle in the example described above) different from each other even when the data are related to the same target.

In order to correctly identify a target object that may take various forms, use of training data completely covering the various forms in learning by a classifier is generally required. However, preparation of training data completely covering the various forms is not necessarily easy.

The technology described in PTL 1 is a technology of improving identification performance on a target that may take various forms, by normalizing an image. However, a function for performing the normalization needs to be derived by learning having images in which various forms of a target appear as training data. A pattern identification unit 100 identifying a target takes a normalized image as an identification target and therefore does not guarantee correct identification of a target taking a form not included in the training data.

An object of the present invention is to provide a learning device capable of generating a feature derivation device capable of deriving, for the same target, interrelated feature values respectively representing features of different forms of the target.

Solution to Problem

A learning device according to an aspect of the present invention includes: an acquisition means for acquiring first data and second data in which forms of a target different from each other are respectively recorded; an encoding means for deriving a first feature value from the first data; a conversion means for converting the first feature value to a second feature value; a decoding means for generating third data from the second feature value; and a parameter updating means for updating a value of a parameter used in derivation of the first feature value and a value of a parameter used in generation of the third data, based on a comparison between the second data and the third data.

A learning method according to an aspect of the present invention includes: acquiring first data and second data in which forms of a target different from each other are respectively recorded; deriving a first feature value from the first data; converting the first feature value to a second feature value; generating third data from the second feature value; and updating a value of a parameter used in derivation of the first feature value and a value of a parameter used in generation of the third data, based on a comparison between the second data and the third data.

A storage medium according to an aspect of the present invention stores a program causing a computer to execute: acquisition processing of acquiring first data and second data in which forms of a target different from each other are respectively recorded; encoding processing of deriving a first feature value from the first data; conversion processing of converting the first feature value to a second feature value; decoding processing of generating third data from the second feature value; and parameter updating processing of updating a value of a parameter used in derivation of the first feature value and a value of a parameter used in generation of the third data, based on a comparison between the second data and the third data. For example, the aforementioned storage medium is a computer-readable, non-transitory storage medium.

Advantageous Effects of Invention

The present invention can generate a feature derivation device capable of deriving, for the same target, interrelated feature values respectively representing features of different forms of the target.

BRIEF DESCRIPTION OF DRAWINGS

FIG. 2 is a block diagram illustrating a configuration of a learning device according to a first example embodiment of the present invention.

FIG. 3 is a diagram illustrating an example of a matrix used in a variable conversion.

EXAMPLE EMBODIMENT

Figure 1A:
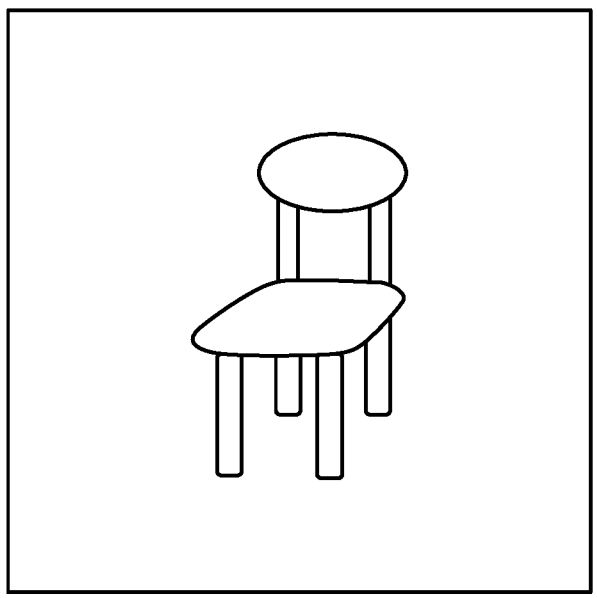
FIG. 1A is a diagram illustrating an example of data in which a target is recorded.

Example embodiments of the present invention will be described in detail below referring to drawings.

First Example Embodiment

First, a first example embodiment of the present invention will be described.
Configuration FIG. 2 is a block diagram illustrating a configuration of a learning device 11 according to the first example embodiment.

The learning device 11 includes a data acquisition unit 111, an encoder 112, a conversion unit 113, a decoder 114, a parameter updating unit 115, an output unit 116, and a parameter storage unit 119.

For example, the data acquisition unit 111, the encoder 112, the conversion unit 113, the decoder 114, the parameter updating unit 115, and the output unit 116 are provided by one or a plurality of central processing units (CPUs) executing a program.

For example, the parameter storage unit 119 is a memory. The parameter storage unit 119 may be an auxiliary storage device such as a hard disk. According to another example embodiment, the parameter storage unit 119 may be configured to be external to the learning device 11 and be communicable with the learning device 11 in a wired or wireless manner. The parameter storage unit 119 stores parameters used in a conversion performed by the encoder 112 and parameters used in a conversion performed by the decoder 114.

The learning device 11 may include a storage device transitorily or non-transitorily storing data, aside from the parameter storage unit 119.
Data Acquisition Unit 111

The data acquisition unit 111 acquires data used by the learning device 11. Data used by the learning device 11 are input data, correct answer data, and difference information indicating a relation between the input data and the correct answer data.

Input data are data in which a target of learning by the learning device 11 is recorded. For ease of understanding, an optical image is assumed as an example of input data in the description of the present example embodiment. Examples of input data other than an optical image will be described in the item "Supplement."

When input data represent an optical image, the input data represent an image in which a target (for example, an object and a person) appears. For example, input data represent a vector having a pixel value of each pixel of an image as a component. When a gray-scale image having 28 pixels in a longitudinal direction and 28 pixels in a lateral direction is assumed as input data, the number of components of the input data is 28×28=784.

An image may have any size. A pixel value may be an integer value ranging from 0 to 255, a binary value being 0 or 1, or a floating-point number. There may be one type or two or more types of colors. When there are a plurality of color types, the number of components of input data increases in proportion to the number of the types. Examples of input data include an RGB image, a multispectral image, and a hyperspectral image.

For example, the data acquisition unit 111 acquires input data by receiving the input data from a storage device internal or external to the learning device 11. The learning device 11 may include a device capable of acquiring input data, such as a camera, and the data acquisition unit 111 may receive input data from the device.

Correct answer data are data used in learning by the learning device 11 and specifically in an update of parameter values by the parameter updating unit 115 to be described later.

Correct answer data are data in which a target indicated by input data is recorded. At least one piece of correct answer data is data in which a target indicated by input data is recorded in a form different from a form in the input data. When input data and correct answer data represent images, a form may be reworded as a "way to be photographed" or a "way to be viewed." Examples of a form in an image include a direction, an angle, a position, a size, a degree of distortion, a hue, and clarity. A form that may differ between input data and correct answer data is predefined. In other words, the learning device 11 handles a set of input data and correct answer data between which at least one specific form differs. The learning device 11 may handle input data as one type of correct answer data.

For example, the data acquisition unit 111 acquires correct answer data by receiving the correct answer data from a storage device internal or external to the learning device 11. The learning device 11 may include a device capable of acquiring correct answer data, such as a camera, and the data acquisition unit 111 may receive correct answer data from the device.

Alternatively, the data acquisition unit 111 may generate correct answer data by processing input data. For example, the data acquisition unit 111 may generate correct answer data by processing input data, by using a process of changing a rotation angle of a target or a known technology of changing a hue or clarity.

Difference information is information indicating a relation between input data and correct answer data. Specifically, difference information indicates the difference between a form of a target indicated by input data and a form of the target indicated by correct answer data. For example, difference information may be represented by a parameter indicating existence of a difference or a degree of difference.

Figure 1B:
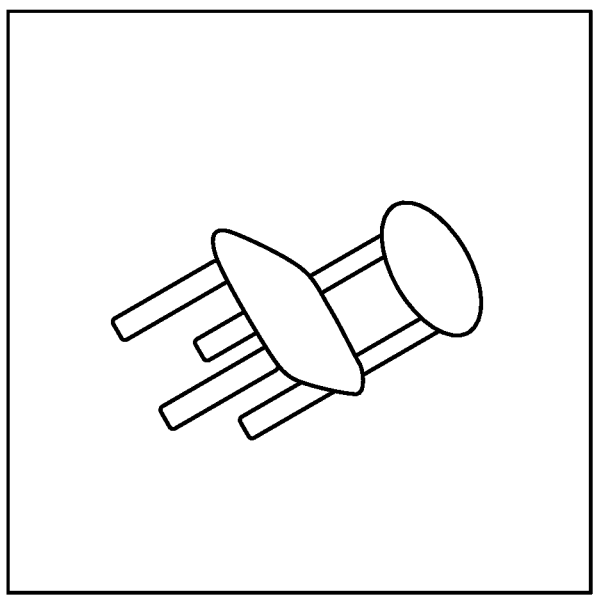
FIG. 1B is a diagram illustrating an example of data in which the target is recorded in another form.
Figure 1C:
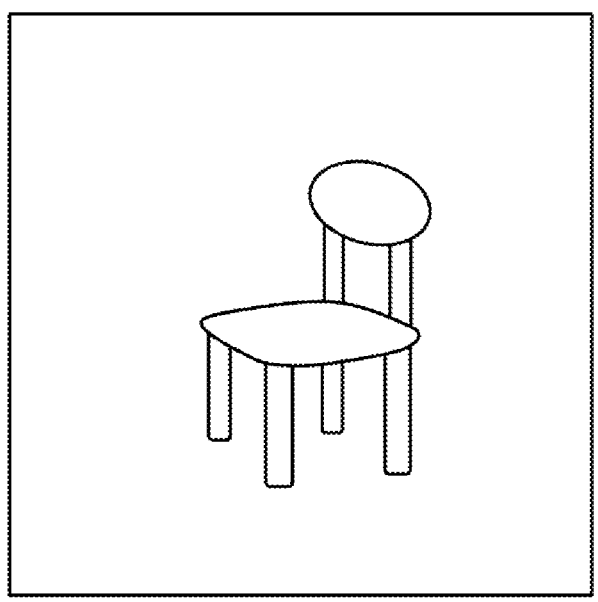
FIG. 1C is a diagram illustrating another example of data in which the target is recorded in another form.

As a simple example, it is assumed that input data represent an image in which a chair appears, and correct answer data represent an image of the chair photographed in a direction different from the direction in the input data. Examples of a set of input data and correct answer data include a set of an image in FIG. 1A and an image in FIG. 1B, and a set of the image in FIG. 1A and an image in FIG. 1C. An example of difference information indicating a relation between the image in FIG. 1A and the image in FIG. 1B is a value [such as "+60 (degrees)"] indicating a rotation angle. An example of difference information indicating a relation between the image in FIG. 1A and the image in FIG. 1C is a value [such as "−20 (degrees)"] indicating a change in an azimuth angle.

For example, when input data represent an optical image, examples of a difference indicated by difference information include a rotation angle with a direction perpendicular to a display surface of an image as an axis, a difference in an angle (a direction of a target relative to an imaging device), an amount of increase (or an amount of decrease) in brightness, a difference in contrast, a difference in a level of noise (noise originating in existence of rain, fog, or the like, or low resolution), and a difference in existence of an obstacle, an attachment, or an ornament, in comparison with input data. When a target is an object streaming in the wind, such as hair or a flag, difference information may be information indicating an intensity of the wind. A parameter closely related to the examples cited above may be employed as difference information. When input data and correct answer data are separately acquired, a form being a target indicated by employed difference information does not need to be a form a change of which can be represented by processing the input data.

Difference information may be a quantitative parameter or may be a parameter having a plurality of steps. As an example, when difference information is a parameter indicating an intensity of rain, the parameter may be represented by four types of values being "no rain," "light," "moderately heavy," and "heavy." Difference information may be a parameter taking only two values (for example, "existence" and "nonexistence").

For example, the data acquisition unit 111 acquires difference information by receiving the difference information from a storage device internal or external to the learning device 11. The data acquisition unit 111 may receive input of difference information from a person or a device grasping a relation between input data and correct answer data, and acquire the input difference information. The data acquisition unit 111 may acquire difference information by specifying the difference by comparison between input data and correct answer data.

Encoder 112

The encoder 112 derives a set of latent variable values from input data. For example, by using a neural network, the encoder 112 inputs input data to the input layer of the neural network and derives n values as an output. Note that n denotes the number of units in the output layer of the neural network. The set of n values is herein referred to as a set of latent variable values or a latent variable vector. While the term "vector" is used in the present example embodiment, a latent variable vector is not limited to a one-dimensional array of a plurality of values. The number of output values may be one. Alternatively, a latent variable vector may be a two-or-more-dimensional array. A latent variable vector may be held in the learning device 11 in a format other than an array format. Derivation of a latent variable vector by a neural network is also referred to as encoding.

A structure of a neural network used by the encoder 112 may be freely designed. For example, there is no limit on the number of layers, the number of components in each layer, and a connection method between components. As an example, the encoder 112 may use a convolutional neural network including an input layer with the number of components being 784, an intermediate layer with the number of components being 512, and an output layer with the number of components being 144. The number of values output by the encoder 112 (that is, the number of components of a latent variable vector) is typically configured to be less than the number of components in input data. However, the number of values output by the encoder 112 may be configured to be equal to or more than the number of components in input data.

An activation function used in a neural network used by the encoder 112 may be any activation function. Examples of an activation function include an identity function, a sigmoid function, a rectified linear unit (ReLU) function, and a hyperbolic tangent function.

The encoder 112 reads values of parameters (typically a weight and a bias) in a neural network to be used from the parameter storage unit 119 and performs encoding of input data.

Conversion Unit 113

The conversion unit 113 converts a latent variable vector output by the encoder 112 to another latent variable vector. Conversion of a latent variable vector by the conversion unit 113 is herein referred to as variable conversion.

The conversion unit 113 converts a latent variable vector by use of a conversion function. The conversion unit 113 uses different conversion functions according to the aforementioned difference information.

For example, the conversion unit 113 uses a conversion function using a conversion parameter taking a value that may vary according to difference information. After determining a conversion parameter according to difference information, the conversion unit 113 may convert a latent variable vector by use of a conversion function using the determined conversion parameter.

Examples of a conversion function include a function changing an arrangement of components of a latent variable vector. For example, a conversion function is a function shifting an arrangement of components of a latent variable vector. An amount of shift may be determined by a conversion parameter. A manipulation of shifting k components in an arrangement of components of a vector with the number of components being n is a manipulation of shifting the first to (n−k)-th components of the vector to the (k+1)-th to n-th components and shifting the (n−k)-th to n-th components to the first to k-th components.

It is assumed as a specific example that a conversion function is a function shifting an arrangement of components of a latent variable vector with the number of components being 144, based on a value of a conversion parameter p. It is assumed that difference information acquired by the data acquisition unit 111 is a rotation angle θ where θ takes a value being a multiple of 5 out of integers equal to or more than 0 and equal to or less than 360. In such a case, a value acquired by dividing θ by 5 may be defined as the conversion parameter p. Then, p is a parameter that may take an integer value in a range from 0 to 71. Then, the conversion function may be defined in such a way that a value twice the value of p corresponds to an amount of shift of the arrangement of the components of the latent variable vector. For example, a value of the conversion parameter p corresponding to a rotation of 40 degrees is 8 and is related to shifting 16 components in the arrangement of the components of the latent variable vector.

For example, a conversion function shifting an arrangement of components of a latent variable vector may be represented as a multiplication of a conversion matrix representing a shift. When a latent variable vector is denoted as $Z_0$, the number of components of the latent variable vector is denoted as n, a value of a conversion parameter is denoted as k, and a conversion matrix representing a shift is denoted as $S_k$, $S_k$ is an n×n matrix, and the aforementioned conversion function is represented by the following equation.

$$F(k, Z_0) = S_k \cdot Z_0$$

The matrix $S_k$ is a matrix illustrated in FIG. 3. Specifically, the matrix $S_k$ is a matrix in which a numerical value of the i-th row and the (kr+i)-th column is 1 for i where $1 \leq i \leq n-kr$, a numerical value of the (n−kr+j)-th row and the j-th column is 1 for j where $1 \leq j \leq kr$, and every remaining numerical value is 0. Note that kr is a value determined by k×n/N(k) when the number of value that may be taken by k is denoted as N(k).

By the conversion by the conversion unit 113, a new latent variable vector with the number of components being n is generated.

A generation method of a function and a matrix for variable conversion is not limited to the above. For example, the conversion unit 113 may use a matrix generated by applying a Gaussian filter to the aforementioned matrix $S_k$ in place of the matrix $S_k$.

The type of variable conversion is not limited to the shift manipulation described above. For example, variable conversion may be subtraction processing on a component value by which an amount of subtraction increases according to magnitude of a difference indicated by difference information. Variable conversion may be smoothing processing executed a number of times based on magnitude of a difference indicated by difference information. Variable conversion is an operation on a predetermined component, and details of the operation or the number of components undergoing the operation may depend on magnitude of a difference indicated by difference information.

Variable conversion performed by the conversion unit 113 may include identity transformation. Variable conversion in a case of difference information indicating nonexistence of a difference in particular may be identity transformation.

When there are two or more types of forms that may be different between input data and correct answer data, the conversion unit 113 may perform a variable conversion, based on difference information related to each form. As an example, when difference information is denoted by two parameters (α, β) each indicating a change in a three-dimensional direction, the conversion unit 113 may generate a new latent variable vector by applying a conversion function dependent on α to a latent variable vector and then applying a conversion function dependent on β. The conversion function dependent on α and the conversion function dependent on β may be applied in parallel. Alternatively, the conversion unit 113 may determine one conversion function, based on difference information about each of the differences between two or more types of forms and execute a variable conversion by use of the conversion function.

Decoder 114

The decoder 114 generates output data from a latent variable vector after conversion by the conversion unit 113. For example, by using a neural network (different from the neural network used by the encoder 112), the decoder 114 inputs a latent variable vector to the input layer of the neural network and generates output data composed of m components as an output. Note that m is the number of units in the output layer of the neural network used by the decoder 114. The value m is set to the same value as the number of components of correct answer data. When input data and correct answer data are data represented in the same format, m matches the number of components of the input data, that is, the number of units in the input layer of the encoder 112. Generation of output data from a latent variable vector by a neural network is also referred to as decoding.

A structure of a neural network used by the decoder 114 may be freely designed. For example, there is no limit on the number of layers, the number of components in an intermediate layer (in a case of a multilayer neural network), and a connection method between components. As an example, the decoder 114 may use a neural network including an input layer with the number of components being 144, an intermediate layer with the number of components being 512, and an output layer with the number of components being 784.

An activation function used in a neural network used by the decoder 114 may be any activation function. Examples of an activation function include an identity function, a sigmoid function, a ReLU function, and a hyperbolic tangent function.

The decoder 114 reads values of parameters (typically a weight and a bias) in a neural network to be used from the parameter storage unit 119 and performs decoding of a latent variable vector.

Parameter Updating Unit 115

The parameter updating unit 115 updates parameter values of neural networks used by the encoder 112 and the decoder 114, based on a comparison between output data generated by the decoder 114 and correct answer data acquired by the data acquisition unit 111.

A specific example of a parameter value updating procedure will be described. First, for each of one or more sets of correct answer data and output data, the parameter updating unit 115 calculates an error of the output data with respect to the correct answer data. For example, the parameter updating unit 115 may use a mean square error as an error function for determining an error. Then, the parameter updating unit 115 determines new parameter values in such a way as to reduce the calculated error. A method known as a parameter value optimization method employed in a common autoencoder may be used as a technique for determining new parameter values. As an example, the parameter updating unit 115 may calculate a gradient by use of error back propagation and determine parameter values by use of stochastic gradient decent (SGD). Other employable techniques include "RMSprop," "Adagrad," "Adadelta," and "Adam."

Then, the parameter updating unit 115 records the determined new parameter values into the parameter storage unit 119. The encoder 112 and the decoder 114 thereafter use the new parameter values. The above concludes the specific updating procedure.

Target parameters to be updated by the parameter updating unit 115 are a weight and a bias of a neural network used by the encoder 112, and a weight and a bias of a neural network used by the decoder 114. A conversion parameter used in a variable conversion is not included in the target parameters to be updated by the parameter updating unit 115.

The parameter updating unit 115 may repeatedly update parameter values a predetermined number of times. For example, the predetermined number of times may be determined as a value received as an input of a numerical value indicating the predetermined number of times from a user of the learning device 11 through an input interface.

An error function used by the parameter updating unit 115 for determining an error may be freely designed. The parameter updating unit 115 may use an error function considering values of an average and a variance of a latent variable vector, such as an error function used in a variational autoencoder (VAE).

Output Unit 116

The output unit 116 outputs information about updated parameter values. For example, the output unit 116 outputs parameter values optimized by repeatedly updating the parameter values by the parameter updating unit 315. Examples of an output destination of an output by the output unit 116 include a display device, a storage device, and a communication network. When the output unit 116 outputs information to a display device, the output unit 116 may convert information in such a way that the display device can display the information. The aforementioned display device and storage device may be devices external to the learning device 11 or components included in the learning device 11.

Outline of Processing

Figure 4:
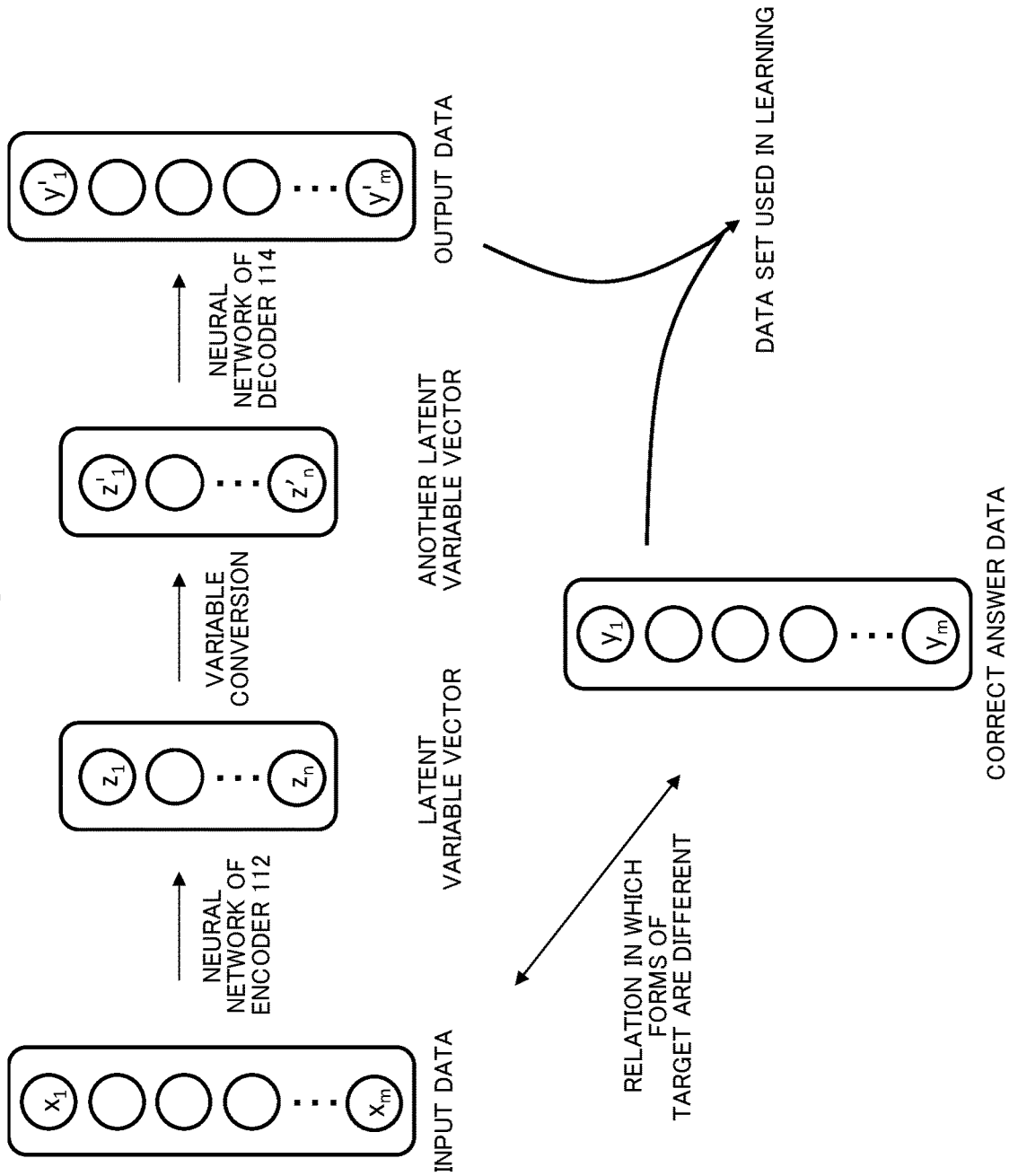
FIG. 4 is a conceptual diagram illustrating a generation process of output data by the learning device according to the first example embodiment.

An outline of processing performed by the learning device 11 will be described. FIG. 4 is a conceptual diagram illustrating a generation process of output data by the learning device 11.

First, a latent variable vector having n components ($z_1$, $z_2$, ..., $z_n$) are derived from input data having m data values ($x_1$, $x_2$, ..., $x_m$) as components by a neural network of the encoder 112. The latent variable vector is converted to another latent variable vector having n components ($z'_1$, $z'_2$, ..., $z'n$) by a variable conversion by the conversion unit 113. Output data having m components ($y'_1$, $y'_2$, ..., $y'_m$) are generated from the another latent variable vector by a neural network of the decoder 114.

A set of the thus generated output data and correct answer data having m components ($y_1$, $y_2$, ..., $y_m$) and being in such a relation with the input data that forms of the target are different is used for learning as a training data set.

Specific Example of Operation

Figure 5:
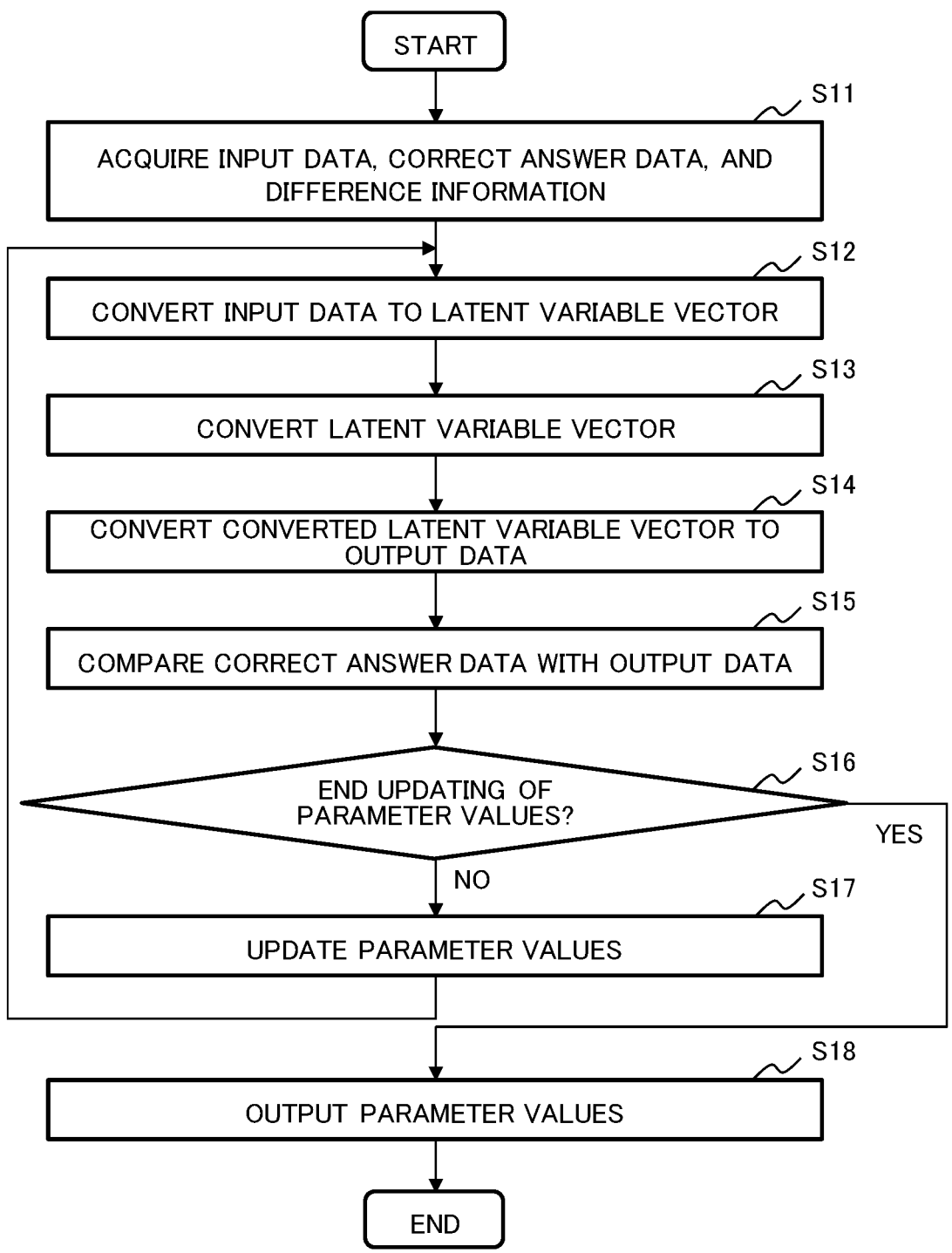
FIG. 5 is a flowchart illustrating an operation flow of the learning device according to the first example embodiment.

A specific example of an operation of the learning device 11 will be described. FIG. 5 is a flowchart illustrating an operation flow of the learning device 11. When each type of processing is executed by a device executing a program, the each type of processing may be executed according to the order of instructions in the program. When each type of processing is executed by a separate device, processing may be executed by a device completing the previous processing giving notification to a device executing the processing. For example, each unit performing processing records data generated by each type of processing into a storage area included in the learning device 11 or an external storage device. Each unit performing processing may receive data required for each type of processing from a unit generating the data or read the data from the aforementioned storage area included in the learning device 11 or the aforementioned external storage device.

First, the data acquisition unit 111 acquires input data, correct answer data, and difference information (Step S11). Timings at which the pieces of data are acquired may not be the same. A timing at which data are acquired may be any time before processing in a step in which the data are used is performed.

Next, the encoder 112 converts the input data to a latent variable vector (Step S12).

Next, the conversion unit 113 converts the latent variable vector by use of conversion parameter values based on a difference indicated by the difference information (Step S13).

Next, the decoder 114 converts the converted latent variable vector to output data (Step S14).

Next, the parameter updating unit 115 determines whether to end updating of parameter values used in the encoder 112 and the decoder 114.

For example, a case of ending updating is a case of the number of times the parameter updating unit 115 updates the parameter values reaching a predetermined number of times.

As another example, a case of ending updating may be a case of an error of the output data with respect to the correct answer data being sufficiently small. For example, the parameter updating unit 115 may determine that the error is sufficiently small in the following cases and determine to end updating.

When a value indicating the error falls below a predetermined reference value, when the error is unable be decreased any more, or when a decrement (that is, the difference between the error immediately before the last update and the error after the update) or a decline rate (that is, a ratio of the decrement to the current error) of the error falls below a predetermined reference value.

Alternatively, the parameter updating unit 115 may determine to end updating when an average value or a maximum value of an absolute amount of change in each parameter value (that is, an absolute value of an amount of change in a parameter value when updating is performed) or an average value or a maximum value of a rate of change (that is, a ratio of the absolute amount of change to the current value) falls below a predetermined reference value.

When not ending updating (NO in Step S16), the parameter updating unit 115 updates the parameter values (Step S17), and the learning device 11 performs the processing in Steps S12 to Step S14 again. In the processing in Step S12 and Step S14 from the second time onward, the encoder 112 and the decoder 114 perform the processing by use of the updated parameter values. The parameter updating unit 115 compares output data newly generated by the processing in Step S14 with the correct answer data again (Step S15) and determines whether to end updating of the parameter values. Thus, the learning device 11 repeats updating of the parameter values and generation of output data using the updated parameter values until updating of the parameters is determined to be ended. Processing of updating the parameter values through such repetition is the learning. The parameter updating unit 115 updates parameter values by, in a sense, learning with a set of output data and correct answer data as a training data set. Making parameter values more suitable values by repeatedly performing updates is also referred to as optimization.

When updating of the parameter values is determined to be ended (YES in Step S16) the output unit 116 outputs the parameter values (Step S18).

Effects

The learning device 11 according to the first example embodiment can derive, for the same target, interrelated latent variable vectors respectively representing features of different forms of the target.

Based on the aforementioned specific example, an example of an effect provided by the learning device 11 is as follows.

The encoder 112, the conversion unit 113, and the decoder 114 in the learning device 11 after completion of learning can generate a plurality of images representing different forms of a target, according to a conversion parameter. Accordingly, even when a form of the target in an image changes, a latent variable vector output by the encoder 112 can represent the change by a conversion. In other words, a combination of the encoder 112 and the conversion unit 113 can generate interrelated latent variable vectors respectively representing features of the different forms of the target.

When a difference between forms is a difference that may be represented quantitatively, a set of the conversion unit 113 and the decoder 114 may generate data in which a form not included in correct answer data is recorded. For example, it is assumed in variable derivation learning that data in which a target in a certain form (denoted as a "form SA") is recorded and data in which the target in another form (denoted as a "form SC") is recorded are respectively used as correct answer data. The conversion unit 113 can generate a latent variable vector representing the target in a form (denoted as a "form SB") corresponding to a form between the form SA and the form SC from a latent variable vector representing the target in the form SA, by a variable conversion using a half value of a value of a conversion parameter corresponding to a change from the form SA to the form SC. By generating output data from the latent variable vector by the decoder 114, output data in which the target in the form SB is recorded may be generated.

Even when a difference between forms is a difference not represented quantitatively, the set of the conversion unit 113 and the decoder 114 may generate data in which a form not included in correct answer data is recorded. For example, it is assumed in the variable derivation learning that data in which a certain target (denoted as a "target TA") in the form SA is recorded, data in which the target TA in the form SB is recorded, and data in which another target (denoted as a "target TB") in the form SA is recorded are respectively used as correct answer data. By the learning, the set of the conversion unit 113 and the decoder 114 can generate data in which the target TA in the form SA is recorded and data in which the target TA in the form SB is recorded from a latent variable vector. Accordingly, the conversion unit 113 is considered to be able to derive a latent variable vector representing the target TB in the form SB by converting the latent variable vector representing the target TB in the form SA. Then, it is expected that, by decoding, the converted latent variable vector can generate data in which the target TB in the form SB is recorded.

When a difference between forms is a difference that may be represented quantitatively, the encoder 112 may be able to derive a latent variable vector representing a target in a form not included in input data. For example, it is assumed in the variable derivation learning that data in which a target in the form SA is recorded and data in which the target in the form SC is recorded are respectively used as input data. When data in which the target in the form SB corresponding to a form between the form SA and the form SC is recorded are input to the encoder 112 after optimization of parameter values, a derived latent variable vector may be similar to (or match) a latent variable vector that can be generated from a latent variable vector representing the target in the form SA by performing a variable conversion. In other words, from the target in a form not used in the learning, the encoder 112 may be able to derive a latent variable vector that can be converted to a latent variable vector representing a form other than the form.

Even when a difference between forms is a difference not represented quantitatively, the encoder 112 may derive a latent variable vector representing the target in a form not included in input data. For example, it is assumed in the variable derivation learning that data in which the target TA in the form SA is recorded, data in which the target TA in the form SB is recorded, and data in which the target TB in the form SA is recorded are respectively used as input data. By the learning, the encoder 112 can derive a latent variable vector representing the target TA in the form SB. Accordingly, the encoder 112 is considered to be also able to derive a latent variable vector representing the target TB in the form SB from data in which the target TB in the form SB is recorded. Then, it is expected that, by a variable conversion, a latent variable vector representing the target TB in the form SA can be converted from the derived latent variable vector.

As described above, by the variable derivation learning, the encoder 112 may be able to derive interconvertible latent variable vectors by a conversion using a conversion parameter for the same target in a different form.

For example, the following effect is provided by the encoder 112 being able to derive a latent variable vector having a character as described above.

For example, when a classifier for identifying a target is constructed by use of a neural network of the encoder 112, a probability of correctly identifying a target taking a form not included in training data is higher compared with a classifier using an ordinary neural network.

Furthermore, for example, an image of a target appearing in a form different from a form in input data can be acquired by generating output data from the input data by use of the encoder 112, the conversion unit 113, and the decoder 114, while setting any values to conversion parameter values. By generating the output data from the input data while setting various values to the conversion parameter values, images in which various forms of the target appear can be generated. The conversion parameter values are associated with difference information, and therefore an image of the target in any form can be generated. For example, in an example of defining a rotation angle to be associated with a shift of a latent variable vector, an image in which a target appears in a desired angle can be generated by suitably setting an amount of shift of the latent variable vector as a result of learning.

The various images generated by the decoder 114 can be used as training data in learning by a classifier performing class classification with the latent variable vector as an input. As a result of such learning, the classifier may correctly classify a target taking a form not included in training data used in learning by the learning device 10.

Supplement

The learning device 11 may handle any type of data, any target, and any difference in forms, as long as two or more pieces of data in which forms of a target are different and information (difference information) indicating the differences between the data can be acquired.

Input data are not limited to an optical image. Input data may be any data as long as a target a form of which may change can be recorded in the data, and the data can be represented by a variable that may be converted by a neural network.

An example of input data is SAR data. SAR data are sensing data acquired by a synthetic aperture radar (SAR). Examples of a target recorded by SAR data include a topography, a structure, a vehicle, an aircraft, and a ship. Examples of a variable form include an azimuth angle and a depression angle when SAR data are acquired. In other words, a difference resulting from a condition when sensing is performed by a SAR may be employed as a difference handled by the learning device 11.

For example, input data may be time series data of sensing data acquired by a sensing device.

For example, input data may be sound data. Sound data are data in which a sound is recorded. When input data are sound data, the input data may be represented specifically by an amplitude per unit time, an intensity of a spectrogram per time window, or the like.

When input data are sound data, examples of a target include a human voice, a speech content, an acoustic event, and music. An acoustic event refers to a sound indicating occurrence of some event, such as a scream or a glass shattering sound. When input data are sound data, examples of a variable form include a frequency (a pitch of a sound), a recording place, an echo level, a tone, a reproduction speed (a tempo) of data, a noise level, a type of object generating a sound, and a person generating a sound or an emotional state of the person.

Second Example Embodiment

Figure 6:
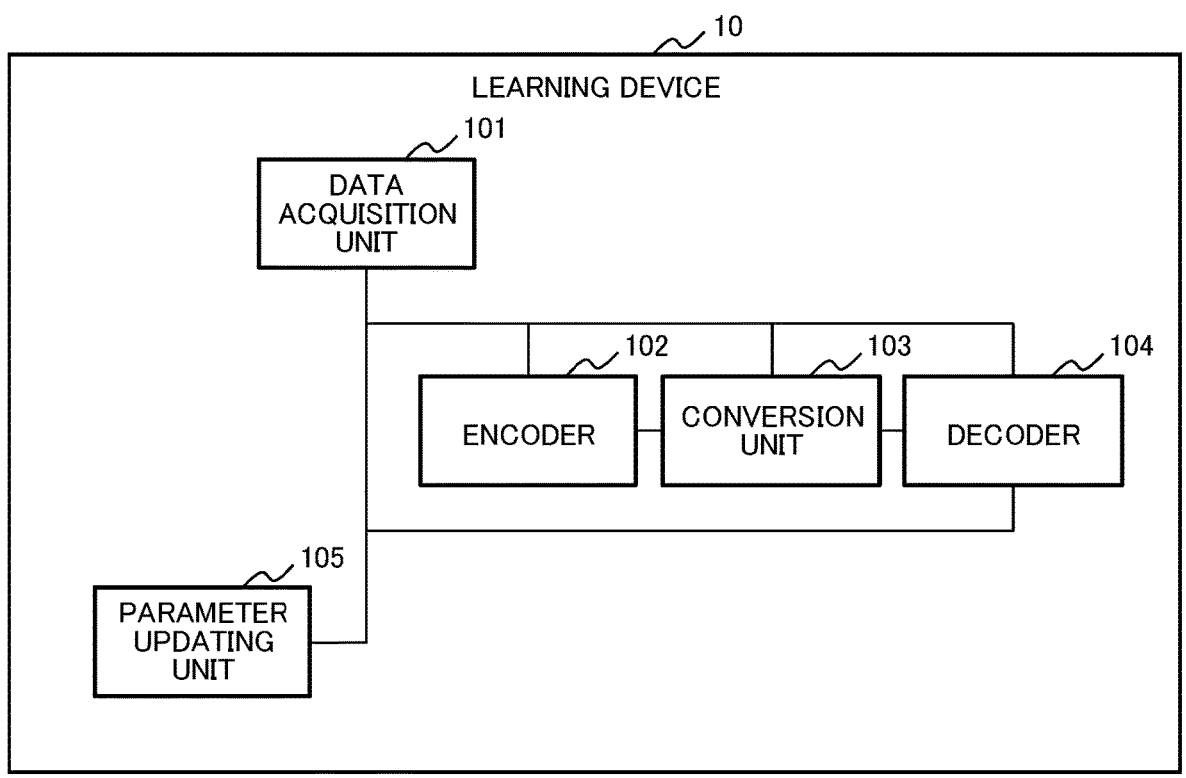
FIG. 6 is a block diagram illustrating a configuration of a learning device according to one example embodiment of the present invention.

A learning device 10 according to one example embodiment of the present invention will be described. FIG. 6 is a block diagram illustrating a configuration of the learning device 10. The learning device 10 includes a data acquisition unit 101, an encoder 102, a conversion unit 103, a decoder 104, and a parameter updating unit 105.

The data acquisition unit 101 acquires first data and second data in which forms of a target different from each other are respectively recorded.

The encoder 102 derives a feature value from first data. In other words, a feature value is a set of values indicating a feature of a target included in data. In yet other words, a feature value may be referred to as information representing a target, data representation, or the like. Derivation of feature value is also referred to as "extracting a feature value." A "latent variable vector" according to the aforementioned example embodiment corresponds to a "feature value" according to the present example embodiment. A form in which a feature value is held in the learning device 10 is not considered relevant. For example, a feature value may be held in an array format or may be held as values of variables assigned with names.

A feature value derived from first data by the encoder 102 is hereinafter referred to as a "first feature value."

The conversion unit 103 converts a first feature value derived by the encoder 102 to a second feature value. The conversion unit 103 may convert the first feature value by use of a function varying according to the difference between a form of the target in the first data and a form of the target in the second data. The number of components of the second feature value may be the same as or different from the number of components of the first feature value.

The decoder 104 generates third data from a second feature value. The third data are data represented in the same format as second data.

Based on a comparison between second data and third data, the parameter updating unit 105 updates values of parameters used in derivation of a feature value (including derivation of a first feature value) by the encoder 102 and values of parameters used in generation of third data by the decoder 104. Specifically, the parameter updating unit 105 updates the parameter values in such a way that the third data are generated as similarly to the second data as possible. For example, updating parameter values means recording new parameter values into a storage unit storing the parameters. The parameter updating unit 105 may output the new parameter values to a device external to the learning device 10 (for example, a storage device, a display device, or an information processing device using a neural network).

The parameter updating unit 105 does not include a parameter used in a conversion performed by the conversion unit 103 as an update target.

Figure 7:
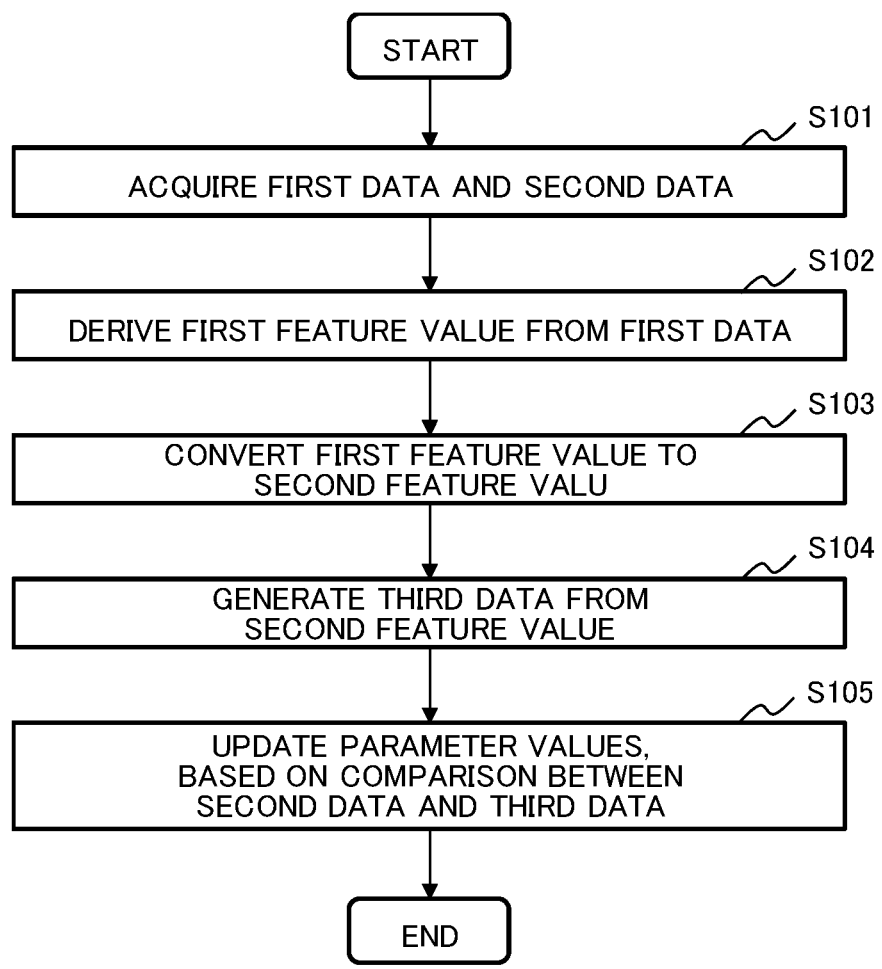
FIG. 7 is a block diagram illustrating a processing flow of a learning method by the learning device according to the one example embodiment of the present invention.

Referring to a flowchart in FIG. 7, an example of a processing flow by the learning device 10 will be described. First, the data acquisition unit 101 acquires first data and second data in which forms of a target different from each other are respectively recorded (Step S101). Next, the encoder 102 derives a first feature value from the first data (Step S102). Next, the conversion unit 103 converts the first feature value derived by the encoder 102 to a second feature value (Step S103). Next, the decoder 104 generates third data from the second feature value (Step S104). Then, based on a comparison between the second data and the third data, the parameter updating unit 105 updates parameter values used in derivation of a feature value by the encoder 102 and parameter values used in generation of the third data by the decoder 104 (Step S105).

By repeatedly performing the processing in Step S102 to Step S105 in such a way that the decoder 104 can generate second data more similar to the third data, the learning device 10 can generate data similar to the second data even from the first feature value derived from the first data by the encoder 102. Accordingly, while the first feature value derived by the encoder 102 represents a feature of the target taking a first form in the first data, the second feature value generated as a result of converting the first feature value by the conversion unit 103 represents a feature of the target taking a second form in the second data.

In other words, for the same target, interrelated feature values respectively representing features of different forms of the target can be derived by the encoder 102 using parameter values updated by the learning device 10 according to the present example embodiment and the conversion unit 103. By combining the aforementioned encoder 102 and the aforementioned conversion unit 103, a feature derivation device capable of deriving feature values having the character as described above can be generated.

Hardware Configuration Providing Each Unit according to Example Embodiments

A block indicating each component in each device according to each example embodiment of the present invention described above is described on a functional basis. However, a block indicating a component does not necessarily mean that each component is configured with a separate module.

For example, processing by each component may be provided by a computer system reading and executing a program causing the computer system to execute the processing, the program being stored by a computer-readable storage medium. For example, a "computer-readable storage medium" includes a portable medium such as an optical disk, a magnetic disk, a magneto-optical disk, and a nonvolatile semiconductor memory, and a storage device such as a read only memory (ROM) built into the computer system and a hard disk. A "computer-readable storage medium" also includes a medium capable of transitorily holding the program such as a volatile memory inside the computer system and a medium transmitting the program, such as a network and a communication line such as a telephone line. The aforementioned program may be a program for providing part of the aforementioned functions and may further be a program capable of providing the aforementioned functions in combination with a program already stored in the computer system.

Figure 8:
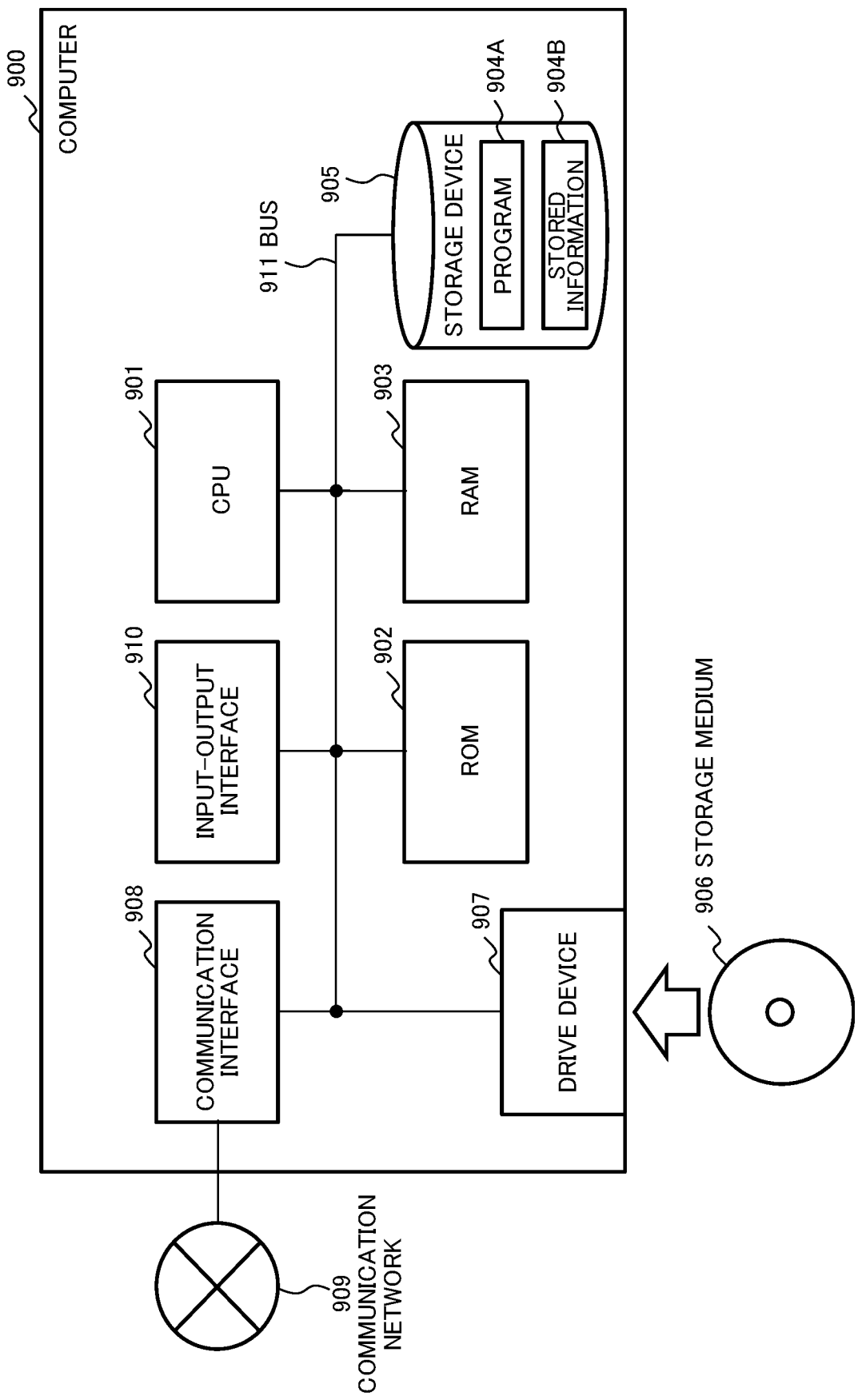
FIG. 8 is a block diagram illustrating an example of hardware constituting each unit according to each example embodiment of the present invention.

As an example, a "computer system" is a system including a computer 900 as illustrated in FIG. 8. The computer 900 includes a configuration as follows.

One or a plurality of CPUs 901,
a ROM 902,
a random access memory (RAM) 903,
a program 904A loaded into the RAM 903, and stored information 904B,
a storage device 905 storing the program 904A and the stored information 904B,
a drive device 907 performing reading and writing from and into a storage medium 906,
a communication interface 908 connected to a communication network 909,
an input-output interface 910 performing input and output of data, and
a bus 911 connecting the components.

For example, each component in each device according to each example embodiment is provided by the CPU 901 loading the program 904A providing the function of the component into the RAM 903 and executing the program. For example, the program 904A providing the function of each component in each device is previously stored in the storage device 905 and/or the ROM 902. Then, the CPU 901 reads the program 904A as needed. For example, the storage device 905 is a hard disk. The program 904A may be supplied to the CPU 901 through the communication network 909, or may be previously stored in the storage medium 906, be read into the drive device 907, and be supplied to the CPU 901. For example, the storage medium 906 is a portable medium such as an optical disk, a magnetic disk, a magneto-optical disk, and a nonvolatile semiconductor memory.

There are various modified examples of a method of providing each device. For example, each device may be provided by a separate, practicable combination of a computer 900 and a program for each component. A plurality of components included in each device may be provided by one practicable combination of a computer 900 and a program.

A part or the whole of each component of each device may be provided by another general-purpose or dedicated circuit, computer, and/or the like, or a combination thereof. The above may be configured with a single chip or a plurality of chips connected through a bus.

When a part or the whole of each component in each device is provided by a plurality of computers, circuits, and/or the like, the plurality of computers, circuits, and/or the like may be placed in a concentrated manner or in a distributed manner. For example, each of the computers, circuits, and/or the like may be provided in a form of being connected through a communication network, such as a client-server system or a cloud computing system.

A part or the whole of the aforementioned example embodiments may also be described as the following Supplementary Notes but are not limited thereto.

Supplementary Notes

Supplementary Note 1

A learning device including:
an acquisition means for acquiring first data and second data in which forms of a target different from each other are respectively recorded;
an encoding means for deriving a first feature value from the first data;
a conversion means for converting the first feature value to a second feature value;
a decoding means for generating third data from the second feature value; and
a parameter updating means for updating a value of a parameter used in derivation of the first feature value and a value of a parameter used in generation of the third data, based on a comparison between the second data and the third data.

Supplementary Note 2

The learning device according to Supplementary Note 1, wherein
the conversion means converts the first feature value to the second feature value by use of a function varying according to a difference between a form of the target in the first data and a form of the target in the second data.

Supplementary Note 3

The learning device according to Supplementary Note 2, wherein the conversion means converts the first feature value to the second feature value by use of the function including a parameter quantitatively indicating the difference.

Supplementary Note 4

The learning device according to any one of Supplementary Notes 1 to 3, wherein
the first data represent an image, and the target is an object or a person.

Supplementary Note 5

The learning device according to any one of Supplementary Notes 1 to 3, wherein
the first data represent an image generated from sensing data by a synthetic aperture radar (SAR), and a difference between the forms is a difference resulting from a condition when sensing is performed by a SAR.

Supplementary Note 6

The learning device according to Supplementary Note 2 or 3, wherein
the encoding means newly derives a feature value from the first data by use of a value of the parameter updated by the parameter updating means, the conversion means newly generates a third feature value from the newly derived feature value by a function different from a function used when the first feature value is converted, and the decoding means generates new data from the third feature value.

Supplementary Note 7

A learning method including:

acquiring first data and second data in which forms of a target different from each other are respectively recorded;

deriving a first feature value from the first data;

converting the first feature value to a second feature value;

generating third data from the second feature value; and updating a value of a parameter used in derivation of the first feature value and a value of a parameter used in generation of the third data, based on a comparison between the second data and the third data.

Supplementary Note 8

The learning method according to Supplementary Note 7, further including converting the first feature value to the second feature value by use of a function varying according to a difference between a form of the target in the first data and a form of the target in the second data.

Supplementary Note 9

The learning method according to Supplementary Note 8, further including converting the first feature value to the second feature value by use of the function including a parameter quantitatively indicating the difference.

Supplementary Note 10

The learning method according to any one of Supplementary Notes 7 to 9, wherein the first data represent an image, and the target is an object or a person.

Supplementary Note 11

The learning method according to any one of Supplementary Notes 7 to 9, wherein the first data represent an image generated from sensing data by a synthetic aperture radar (SAR), and a difference between the forms is a difference resulting from a condition when sensing is performed by a SAR.

Supplementary Note 12

The learning method according to Supplementary Note 8 or 9, further including:

newly deriving a feature value from the first data by use of a value of the updated parameter;

newly generating a third feature value from the newly derived feature value by a function different from a function used when the first feature value is converted; and generating new data from the third feature value.

Supplementary Note 13

A computer-readable storage medium having a program recorded thereon, the program causing a computer to execute:

acquisition processing of acquiring first data and second data in which forms of a target different from each other are respectively recorded;

encoding processing of deriving a first feature value from the first data;

conversion processing of converting the first feature value to a second feature value;

decoding processing of generating third data from the second feature value; and parameter updating processing of updating a value of a parameter used in derivation of the first feature value and a value of a parameter used in generation of the third data, based on a comparison between the second data and the third data.

Supplementary Note 14

The storage medium according to Supplementary Note 13, wherein the conversion processing converts the first feature value to the second feature value by use of a function varying according to a difference between a form of the target in the first data and a form of the target in the second data.

Supplementary Note 15

The storage medium according to Supplementary Note 14, wherein the conversion processing converts the first feature value to the second feature value by use of the function including a parameter quantitatively indicating the difference.

Supplementary Note 16

The storage medium according to any one of Supplementary Notes 13 to 15, wherein the first data represent an image, and the target is an object or a person.

Supplementary Note 17

The storage medium according to any one of Supplementary Notes 13 to 15, wherein the first data represent an image generated from sensing data by a synthetic aperture radar (SAR), and a difference between the forms is a difference resulting from a condition when sensing is performed by a SAR.

Supplementary Note 18

The storage medium according to Supplementary Note 14 or 15, wherein the encoding processing newly derives a feature value from the first data by use of a value of the parameter updated by the parameter updating processing, the conversion processing newly generates a third feature value from the newly derived feature value by a function different from a function used when the first feature value is converted, and the decoding processing generates new data from the third feature value.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST 10, 11 Learning device
101, 111 Data acquisition unit
102, 112 Encoder
103, 113 Conversion unit
104, 114 Decoder
105, 115 Parameter updating unit
116 Output unit
119 Parameter storage unit
900 Computer
901 CPU
902 ROM
903 RAM
904A Program
904B Stored information
905 Storage device
906 Storage medium
907 Drive device 908 Communication interface
909 Communication network
910 Input-output interface
911 Bus

The invention claimed is:

1. A learning device comprising:
   at least one memory storing instructions; and
   at least one processor configured to access the at least one memory and execute the instructions to:
   acquire first data and second data in which forms of a target different from each other are respectively recorded;
   derive a first feature value from the first data;
   convert the first feature value to a second feature value by use of a function varying according to a difference between a form of the target in the first data and a form of the target in the second data;
   generate third data from the second feature value; and
   update a value of a parameter used in derivation of the first feature value and a value of a parameter used in generation of the third data, based on a comparison between the second data and the third data.

2. The learning device according to claim 1, wherein the at least one processor is further configured to execute the instructions to:
   convert the first feature value to the second feature value by use of the function including a parameter quantitatively indicating the difference.

3. The learning device according to claim 1, wherein the first data represent an image, and the target is an object or a person.

4. The learning device according to claim 1, wherein the first data represent an image generated from sensing data by a synthetic aperture radar (SAR), and a difference between the forms is a difference resulting from a condition when sensing is performed by a SAR.

5. The learning device according to claim 1, wherein the at least one processor is further configured to execute the instructions to:
   newly derive a feature value from the first data by use of a value of the parameter updated by the parameter updating means,
   the conversion means newly generates a third feature value from the newly derived feature value by a function different from a function used when the first feature value is converted, and
   the decoding means generates new data from the third feature value.

6. A learning method comprising:
   acquiring first data and second data in which forms of a target different from each other are respectively recorded;
   deriving a first feature value from the first data;
   converting the first feature value to a second feature value by use of a function varying according to a difference between a form of the target in the first data and a form of the target in the second data;
   generating third data from the second feature value; and
   updating a value of a parameter used in derivation of the first feature value and a value of a parameter used in generation of the third data, based on a comparison between the second data and the third data.

7. The learning method according to claim 6, further comprising
   converting the first feature value to the second feature value by use of the function including a parameter quantitatively indicating the difference.

8. The learning method according to claim 6, wherein the first data represent an image, and the target is an object or a person.

9. The learning method according to claim 6, wherein
   the first data represent an image generated from sensing data by a synthetic aperture radar (SAR), and a difference between the forms is a difference resulting from a condition when sensing is performed by a SAR.

10. The learning method according to claim 6, further comprising:
    newly deriving a feature value from the first data by use of a value of the updated parameter;
    newly generating a third feature value from the newly derived feature value by a function different from a function used when the first feature value is converted; and
    generating new data from the third feature value.

11. A non-transitory computer-readable storage medium having a program recorded thereon, the program causing a computer to execute:
    acquisition processing of acquiring first data and second data in which forms of a target different from each other are respectively recorded;
    encoding processing of deriving a first feature value from the first data;
    conversion processing of converting the first feature value to a second feature value by use of a function varying according to a difference between a form of the target in the first data and a form of the target in the second data;
    decoding processing of generating third data from the second feature value; and
    parameter updating processing of updating a value of a parameter used in derivation of the first feature value and a value of a parameter used in generation of the third data, based on a comparison between the second data and the third data.

12. The storage medium according to claim 11, wherein the conversion processing converts the first feature value to the second feature value by use of the function including a parameter quantitatively indicating the difference.

13. The storage medium according to claim 11, wherein the first data represent an image, and the target is an object or a person.

14. The storage medium according to claim 11, wherein the first data represent an image generated from sensing data by a synthetic aperture radar (SAR), and a difference between the forms is a difference resulting from a condition when sensing is performed by a SAR.

15. The storage medium according to claim 11, wherein the encoding processing newly derives a feature value from the first data by use of a value of the parameter updated by the parameter updating processing,
    the conversion processing newly generates a third feature value from the newly derived feature value by a function different from a function used when the first feature value is converted, and
    the decoding processing generates new data from the third feature value.

* * * * *